(12) United States Patent
Fischer et al.

(10) Patent No.: US 11,345,300 B2
(45) Date of Patent: May 31, 2022

(54) ROOF-MOUNTED OCCUPANT RESTRAINT SYSTEM

(71) Applicant: ZF Passive Safety Systems US Inc., Washington, MI (US)

(72) Inventors: Kurt F. Fischer, Rochester, MI (US); Alexandra E. Smith, Richmond, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 16/975,730

(22) PCT Filed: Dec. 3, 2018

(86) PCT No.: PCT/US2018/063554
§ 371 (c)(1),
(2) Date: Aug. 26, 2020

(87) PCT Pub. No.: WO2019/168579
PCT Pub. Date: Sep. 6, 2019

(65) Prior Publication Data
US 2020/0406853 A1    Dec. 31, 2020

Related U.S. Application Data

(60) Provisional application No. 62/666,771, filed on May 4, 2018, provisional application No. 62/661,667, filed
(Continued)

(51) Int. Cl.
*B60R 21/214* (2011.01)
*B60R 21/233* (2006.01)
(Continued)

(52) U.S. Cl.
CPC .......... *B60R 21/214* (2013.01); *B60R 21/233* (2013.01); *B60R 21/239* (2013.01);
(Continued)

(58) Field of Classification Search
CPC ... B60R 21/214; B60R 21/232; B60R 21/233; B60R 21/2338; B60R 21/237;
(Continued)

(56) References Cited

U.S. PATENT DOCUMENTS 3,774,936 A * 11/1973 Barnett ................ B60R 21/214
280/730.1
5,802,479 A * 9/1998 Kithil ..................... B60N 2/002
257/295

(Continued)

FOREIGN PATENT DOCUMENTS

GB        2345669       7/2000
JP    2016030546 A  *  3/2016

*Primary Examiner* — Laura Freedman
(74) *Attorney, Agent, or Firm* — Tarolli, Sundheim, Covell & Tummino LLP

(57) ABSTRACT

A restraint system (10) for helping to protect an occupant (60) of a vehicle (20) having a roof (32) and a cabin (40) including a seat (50) for the occupant (60) has an airbag (70). The airbag (70) has a stored condition within the roof (32) and is inflatable to a deployed condition extending into the cabin (40) and aligned with the seat (50). The airbag (70) includes a first portion (94) defining a first chamber (100) and a second portion (104) defining a second chamber (110). The first portion (94) is connected to the vehicle (20) and includes a vent (106). The first portion (94), in response to occupant (60) penetration with the second portion (104), vents inflation fluid from the vent (106) and elongates to enable folding of the airbag (70) away from the occupant (60).

16 Claims, 6 Drawing Sheets

Related U.S. Application Data on Apr. 24, 2018, provisional application No. 62/636,899, filed on Mar. 1, 2018.

(51) Int. Cl.

| | |
|---|---|
| *B60R 21/2338* | (2011.01) |
| *B60R 21/26* | (2011.01) |
| *B60R 21/239* | (2006.01) |
| *B60R 21/232* | (2011.01) |
| *B60R 21/237* | (2006.01) |
| *B60R 21/231* | (2011.01) |
| *B60R 21/2342* | (2011.01) |
| *B60R 21/00* | (2006.01) |

(52) U.S. Cl.
CPC .......... *B60R 21/2338* (2013.01); *B60R 21/26* (2013.01); *B60R 21/232* (2013.01); *B60R 21/237* (2013.01); *B60R 21/2342* (2013.01); *B60R 2021/0004* (2013.01); *B60R 2021/23153* (2013.01); *B60R 2021/23192* (2013.01); *B60R 2021/23308* (2013.01); *B60R 2021/23316* (2013.01); *B60R 2021/23324* (2013.01); *B60R 2021/23386* (2013.01); *B60R 2021/26058* (2013.01)

(58) Field of Classification Search
CPC ............ B60R 21/239; B60R 2021/161; B60R 2021/23107; B60R 2021/23153; B60R 2021/23161; B60R 2021/23192; B60R 2021/23308; B60R 2021/23316; B60R 2021/23324; B60R 2021/23386
See application file for complete search history.

(56) References Cited

U.S. PATENT DOCUMENTS

| | | | | |
|---|---|---|---|---|
| 6,460,878 B2* | 10/2002 | Eckert | .................. | B60R 21/232 280/730.1 |
| 6,722,691 B1* | 4/2004 | Håland | ................. | B60R 21/214 280/730.1 |
| 6,966,579 B2* | 11/2005 | Schneider | ........... | B60R 21/2338 280/728.2 |
| 8,393,637 B2* | 3/2013 | Choi | .................... | B60R 21/231 280/730.1 |
| 8,403,358 B2* | 3/2013 | Choi | .................... | B60R 21/214 280/728.2 |
| 8,505,966 B2* | 8/2013 | Yoo | ........................ | B60R 21/233 280/730.1 |
| 8,579,321 B2* | 11/2013 | Lee | ........................ | B60R 21/233 280/729 |
| 8,807,593 B2* | 8/2014 | Lee | ........................ | B60R 21/213 280/730.1 |
| 9,180,832 B2* | 11/2015 | Le Norcy | ........... | B60R 21/2338 |
| 9,446,733 B2* | 9/2016 | Pausch | ................ | B60R 21/207 |
| 9,707,921 B2* | 7/2017 | Fischer | ................. | B60R 21/231 |
| 9,771,049 B2* | 9/2017 | Lee | ........................ | B60R 21/232 |
| 10,246,043 B2* | 4/2019 | Schneider | ............. | B60R 21/207 |
| 10,266,145 B2* | 4/2019 | Paxton | ................ | B60R 21/2338 |
| 10,272,868 B2* | 4/2019 | Jaradi | ................... | B60R 21/237 |
| 10,471,923 B2* | 11/2019 | Jimenez | ............... | B60R 21/2338 |
| 10,486,637 B2* | 11/2019 | Thomas | ................ | B60R 21/215 |
| 10,583,799 B2* | 3/2020 | Schneider | ............. | B60R 21/214 |
| 10,589,708 B2* | 3/2020 | Cho | ....................... | B60R 21/2338 |
| 10,625,701 B2* | 4/2020 | Cho | ....................... | B60R 21/214 |
| 10,688,955 B2* | 6/2020 | Shin | ....................... | B60R 21/232 |
| 10,857,965 B2* | 12/2020 | Abe | ....................... | B60R 21/214 |
| 10,953,835 B2* | 3/2021 | Gould | .................. | B60R 21/214 |
| 10,960,839 B2* | 3/2021 | Imura | ...................... | B60N 2/14 |
| 10,974,685 B2* | 4/2021 | Kwon | ................. | B60R 21/2338 |
| 11,040,687 B2* | 6/2021 | Jayakar | ................. | B60R 21/214 |
| 11,059,449 B2* | 7/2021 | Jayakar | ................... | B60R 21/01 |
| 2005/0001412 A1* | 1/2005 | Schneider | ............. | B60R 21/232 280/730.1 |
| 2014/0232092 A1 | 8/2014 | Le Norcy et al. | | |
| 2015/0091279 A1 | 4/2015 | Anderson | | |
| 2018/0272985 A1 | 9/2018 | Nagasawa | | |
| 2019/0248322 A1* | 8/2019 | Herzenstiel | ........... | B60R 21/207 |
| 2020/0391688 A1* | 12/2020 | Schroeder | ............. | B60R 21/233 |
| 2020/0391689 A1* | 12/2020 | Fischer | ................. | B60R 21/214 |
| 2020/0406852 A1* | 12/2020 | Fischer | .................. | B60R 21/26 |
| 2021/0101559 A1* | 4/2021 | Fischer | ................. | B60R 21/232 |
| 2021/0114546 A1* | 4/2021 | Jayakar | ............... | B60R 21/2338 |
| 2021/0114547 A1* | 4/2021 | Fischer | ................. | B60R 21/239 |
| 2021/0179006 A1* | 6/2021 | Hellot | .................. | B60R 21/233 |
| 2021/0268986 A1* | 9/2021 | Gould | .................. | B60R 21/214 |

\* cited by examiner

ROOF-MOUNTED OCCUPANT RESTRAINT SYSTEM

CROSS REFERENCE TO RELATED APPLICATIONS

This application is a national stage of International Application No. PCT/US2018/063554, filed Dec. 3, 2018, which claims benefit of U.S. Provisional Appln. No. 62/636,899, filed Mar. 1, 2018, 62/661,667, filed Apr. 24, 2018, and 62/666,771, filed May 4, 2018. The disclosures of these applications are incorporated herein by reference in their entireties.

TECHNICAL FIELD

The present invention relates generally to vehicle airbags and, in particular, relates to a roof-mounted airbag having multiple chambers.

BACKGROUND

It is known to provide an inflatable vehicle occupant protection device, such as an airbag, for helping to protect an occupant of a vehicle. One particular type of airbag is a frontal airbag inflatable between an occupant of a front seat of the vehicle and an instrument panel of the vehicle. Such airbags may be driver airbags or passenger airbags. When inflated, the driver and passenger airbags help protect the occupant from impacts with parts of the vehicle such as the instrument panel and/or a steering wheel of the vehicle.

Passenger airbags are typically stored in a deflated condition in a housing that is mounted to the vehicle instrument panel. An airbag door is connectable with the housing and/or instrument panel to help enclose and conceal the airbag in a stored condition. Upon deployment of the passenger airbag, the airbag door opens to permit the airbag to move to an inflated condition. The airbag door opens as a result of forces exerted on the door by the inflating airbag.

Driver airbags are typically stored in a deflated condition in a housing that is mounted on the vehicle steering wheel. An airbag cover is connectable with the housing and/or steering wheel to help enclose and conceal the airbag in a stored condition. Upon deployment of the driver airbag, the airbag cover opens to permit the airbag to move to an inflated condition. The airbag cover opens as a result of forces exerted on the cover by the inflating driver airbag.

There are trends in the auto industry to make vehicles more spacious. Styling has been making the instrument panel smaller and thus farther away from the occupant. Looking further into the future, driverless, autonomous vehicles are even more spacious. Autonomous vehicles have been contemplated for some time, and now their adaption on a large scale is approaching. Autonomous vehicles can eliminate some of the structure.

With these realities as a backdrop, the paradigm of occupant safety systems must shift. In the past, the necessity of a vehicle operator/driver lent to a somewhat standard vehicle passenger cabin configuration. In the U.S., the driver is a front seat, left side, forward facing occupant within reach of the vehicle controls and instrumentation (steering wheel, pedals, instrument panel, console, etc.). This driver configuration helps dictate the layout of the remainder of the vehicle—front seat, forward-facing passenger-side occupant, rear seat (second row, third row, etc.) forward-facing occupants. Accordingly, in the past, occupant safety systems were typically designed with this passenger cabin layout and the associated occupant positions and orientations in mind.

The autonomous vehicle eliminates the operator/driver, which eliminates the necessity of their being positioned and oriented in the conventional manner. Vehicle manufacturers are free utilize passenger cabin space as they see fit without being constrained to predetermined passenger arrangements, such as all forward-facing occupants, or vehicle structural configurations, such as steering wheel/instrument panel configurations, center console configurations, foot well pedal controls, etc.

This presents the challenge of not only where to locate airbag systems, but also finding a reaction surface against which to position the airbag so that it can absorb impacts. Typically, instrument panel and steering wheel mounted frontal airbags utilize those structures as a reaction surface against which the airbag rests so that it can oppose, cushion, and absorb the impact energy of an impacting occupant and provide a desired ride-down effect. In the autonomous vehicles, however, the vehicle may not have an instrument panel or steering wheel at all, and the occupants can be positioned and oriented outside the traditional manner. This can make it difficult or impossible to utilize traditional structures in the vehicle as reaction surface.

SUMMARY

In one example, a restraint system for helping to protect an occupant of a vehicle having a roof and a cabin including a seat for the occupant has an airbag. The airbag has a stored condition within the roof and is inflatable to a deployed condition extending into the cabin and aligned with the seat. The airbag includes a first portion defining a first chamber and a second portion defining a second chamber. The first portion is connected to the vehicle and includes a vent. The first portion, in response to occupant penetration with the second portion, vents inflation fluid from the vent and elongates to enable folding of the airbag away from the occupant.

In another example, a restraint system for helping to protect an occupant of a vehicle having a roof and a cabin including a seat for the occupant has an airbag with a stored condition within the roof. The airbag is inflatable to a deployed condition extending into the cabin and aligned with the seat. The airbag includes a first portion defining a first chamber and a second portion defining a second chamber. The first portion is connected to the vehicle and includes a vent. A folded portion extends into an interior of the airbag between the first and second chambers. A pair of tethers each has a first end connected to the second portion and a second end connected to the roof for limiting movement of the deployed airbag. The second portion pivots about the first end of the tether and the first portion pivots about the vehicle in response to occupant penetration into the second portion such that the inflation fluid exits the vent to allow the airbag to fold away from the penetrating occupant.

Other objects and advantages and a fuller understanding of the invention will be had from the following detailed description and the accompanying drawings.

DETAILED DESCRIPTION

Figure 1:
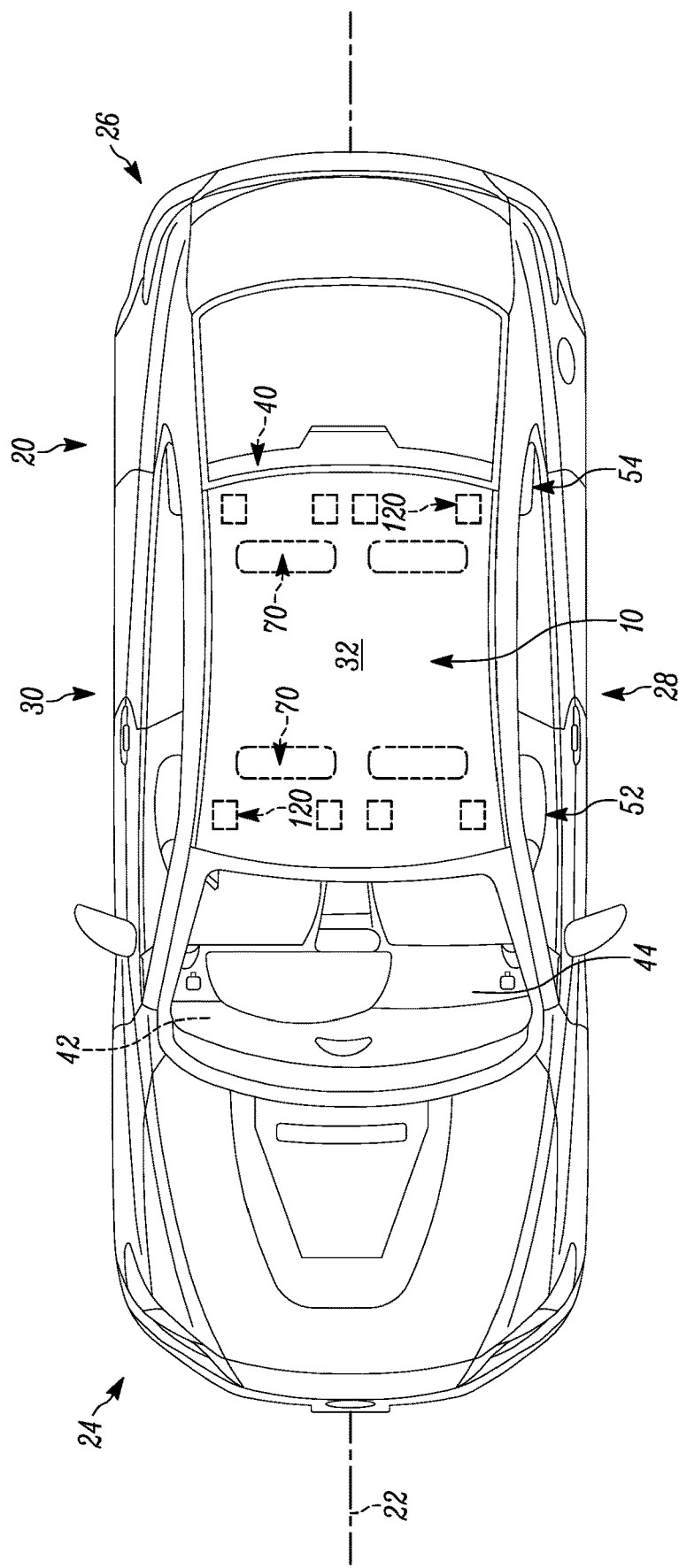
FIG. 1 is a top view of a vehicle including a roof-mounted, occupant restraint system in accordance with the present invention.
Figure 2:
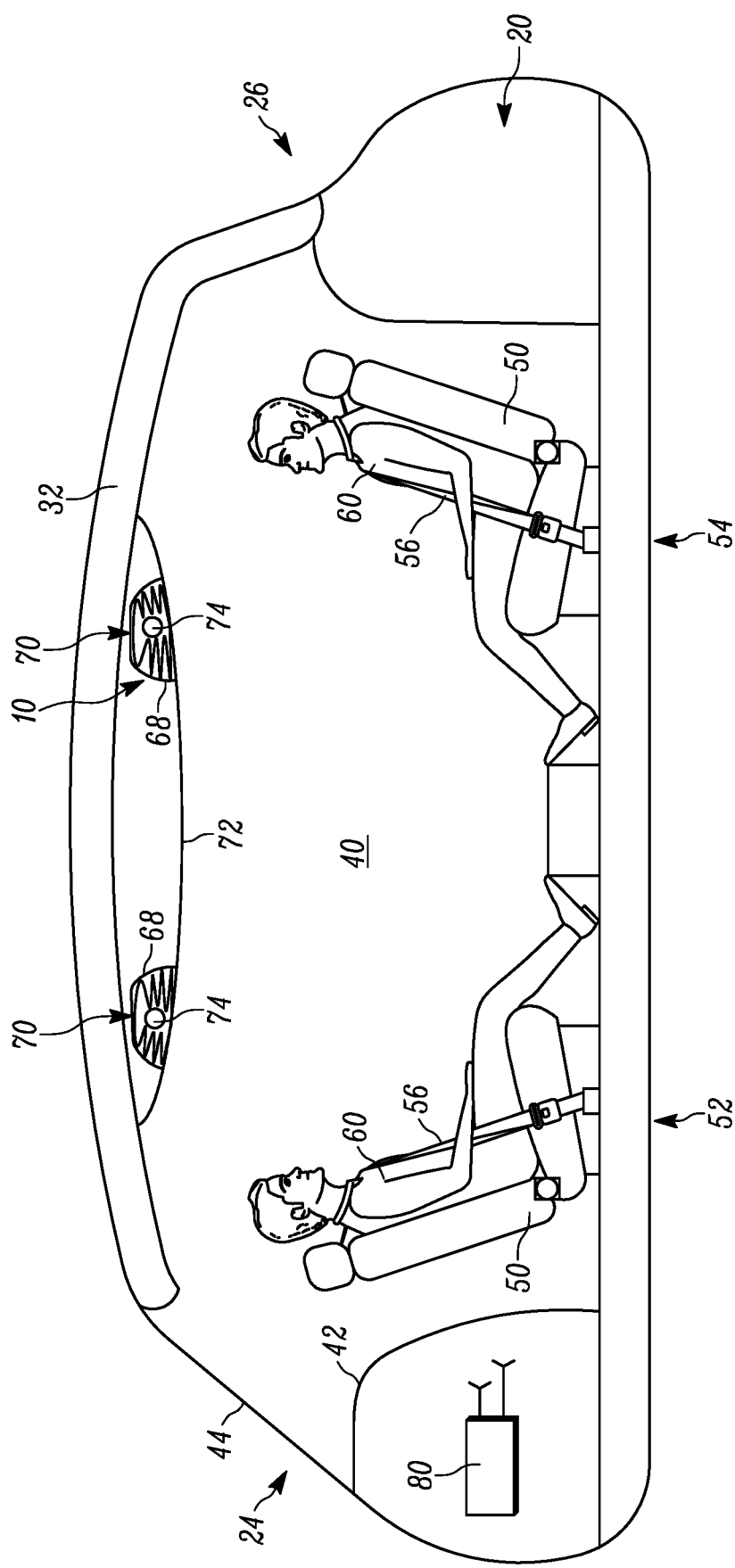
FIG. 2 is a schematic illustration of a cabin of the vehicle with an airbag of the restraint system in a stored condition.

The present invention relates generally to vehicle airbags and, in particular, relates to a roof-mounted airbag having multiple chambers. FIGS. 1-2 illustrate an example vehicle safety system in the form of an occupant restraint system 10. The vehicle 20 extends along a centerline 22 from a first or fore end 24 to a second or aft end 26. The vehicle 20 extends to a left side 28 and a right side 30 on opposite sides of the centerline 22. The first end 24 of the vehicle 20 includes an instrument panel 42 facing a passenger compartment or cabin 40. A windshield or windscreen 44 can be located between the instrument panel 42 and the roof 32.

The vehicle 20 can be an autonomous vehicle, in which case the cabin 40 can be without operator controls, such as a steering wheel, pedals, instrumentation, center console, etc. Accordingly, the instrument panel 42 can be reduced in size or removed altogether in order to maximize the space in the cabin 40.

Seats 50 are positioned in the cabin 40. In this open passenger cabin 40 configuration, the vehicle seats 50 can be configured, positioned, and arranged in a variety of manners, not constrained by the need to facilitate a vehicle driver/operator. For example, in FIG. 2, the seats 50 can be arranged in front and rear rows 52 and 54, respectively, facing each other, with the front row facing rearward toward the rear row. Alternatively, the front and rear rows 52 and 54 can both be arranged in a forward-facing manner (not shown), similar to that of conventional automobiles. In either case, each seat 50 is fitted with a seatbelt 56 for restraining its occupant 60. Control interfaces for climate controls, GPS, navigation, entertainment, etc. can, for example, be provided in a center console area of the vehicle 20 located between the occupants 60 of the front and/or rear rows 52, 54.

For the unconventional, forward-rearward seating arrangement of FIG. 2, in the event of a frontal crash, the occupants 60 of the rear row 54 are restrained by their respective seatbelts 56. Occupants 60 of the rear-facing rear front row 52, while buckled, are supported in a frontal crash by the seatbacks of the vehicle seats 50. Because of this, the seats 50 must be constructed to support the occupants 60 in the event of a crash. For the forward-facing occupants 60 in the rear row 54, the seatbelts 56 offer some degree of restraint. It is desirable, however, for both rows 52, 54 to include additional restraints for head and neck support.

Since the front row 52 need not face forward and need not be in close proximity to the instrument panel 42 or the area where an instrument panel would normally reside, there can be a large volume of space between the front row 52 and the forward cabin structure presented facing the front row. Because of this, it may not be efficient to deploy airbags from this location due to the large volume that the airbags would need to occupy. This would present problems in sizing the airbag(s) and inflator(s) to occupy that large volume, and could also present problems in deploying the airbag(s) into that large volume in the necessary short time required to protect the occupants in a crash scenario.

It is therefore evident that the various passenger seating configurations enabled by autonomous vehicles can present challenges to the conventional concepts of airbag protection. Furthermore, since airbags require structure supporting the deployed airbag against movement in response to occupant penetration (e.g., a reaction surface), the absence of typical vehicle architecture that acts as a reaction surface, such as an instrument panel, presents additional challenges.

With this in mind, the occupant safety system 10 shown in FIGS. 1-2 includes at least one vehicle occupant protection device in the form of an inflatable curtain airbag 70 mounted in the roof 32 of the vehicle 20. Mounting the airbags 70 in the vehicle roof 32 is convenient because the airbags can be positioned in a location with a desired proximity to the occupant(s) 60 they are intended to help protect. This can help reduce the necessary inflatable volume of the airbags 70 and can also help provide a desired airbag deployment time without requiring an excessively high-volume inflator.

The airbags 70 are housed/concealed in the roof structure of the vehicle 12 behind, for example, a roof liner 72. The airbag 70 is at least one of rolled and folded before being placed behind the roof liner 72. The rolled airbag 70 can be provided in a cover or housing/module 68 that is then placed behind the roof liner 72. The occupant restraint system 10 also includes an inflator 74 positioned in each housing 68 for providing inflation fluid to each airbag 70. The inflators 74 are operatively connected (e.g., by wires) to an airbag controller 80 (see FIG. 2) that includes or communicates with one or more crash sensors (not shown). The airbag controller 80 is operative to determine the occurrence of a crash event and to actuate the inflators 74 in a known manner to inflate the airbags 70. The inflators 74 can be of any known type, such as stored gas, solid propellant, augmented or hybrid.

The airbag 70 can be constructed of any suitable material, such as nylon (e.g., woven nylon 6-6 yarns), and may be constructed in any suitable manner. For example, the airbag 70 may include one or more pieces or panels of material. If more than one piece or panel is used, the pieces or panels can be interconnected by known means, such as stitching, ultrasonic welding, heat bonding, or adhesives, to form the airbag 70. The airbag 70 can be uncoated, coated with a material, such as a gas impermeable urethane, or laminated with a material, such as a gas impermeable film. The airbag 70 can therefore have a gas-tight or substantially gas-tight construction. Those skilled in the art will appreciate that alternative materials, such as polyester yarn, and alternatives coatings, such as silicone, may also be used to construct the airbag 70.

The occupant restraint system 10 can include multiple airbags 70 provided along the roof 32 and within the roof liner 72 at locations associated and aligned with each seat 50 in each row 52, 54. In other words, each seat 50 in the vehicle 20 can have an individual airbag 70 (and corresponding inflator 74) associated and aligned therewith. In each case, the airbag 70 is positioned in front of the associated seat 50 in each row 52, 54 in the direction the occupants 60 in those seats would face (i.e., rearward of the front row 52 and forward of the rear row 54). The airbags 70 extend in the left-to-right direction of the vehicle 20 and generally parallel to the width of the seats 50. Alternatively, a single airbag 70 can span the entire width of the cabin 40 to protect all the occupants 60 in an entire row 52 or 54 (not shown). In the example shown in FIG. 2, airbags 70 are provided behind the roof liner 72 and associated with a seat 50 in each row 52, 54. Although the airbags 70 are identical, the construction and operation of only the airbag associated with a seat 50 in the rear row 54 is discussed for brevity.

Figure 3A:
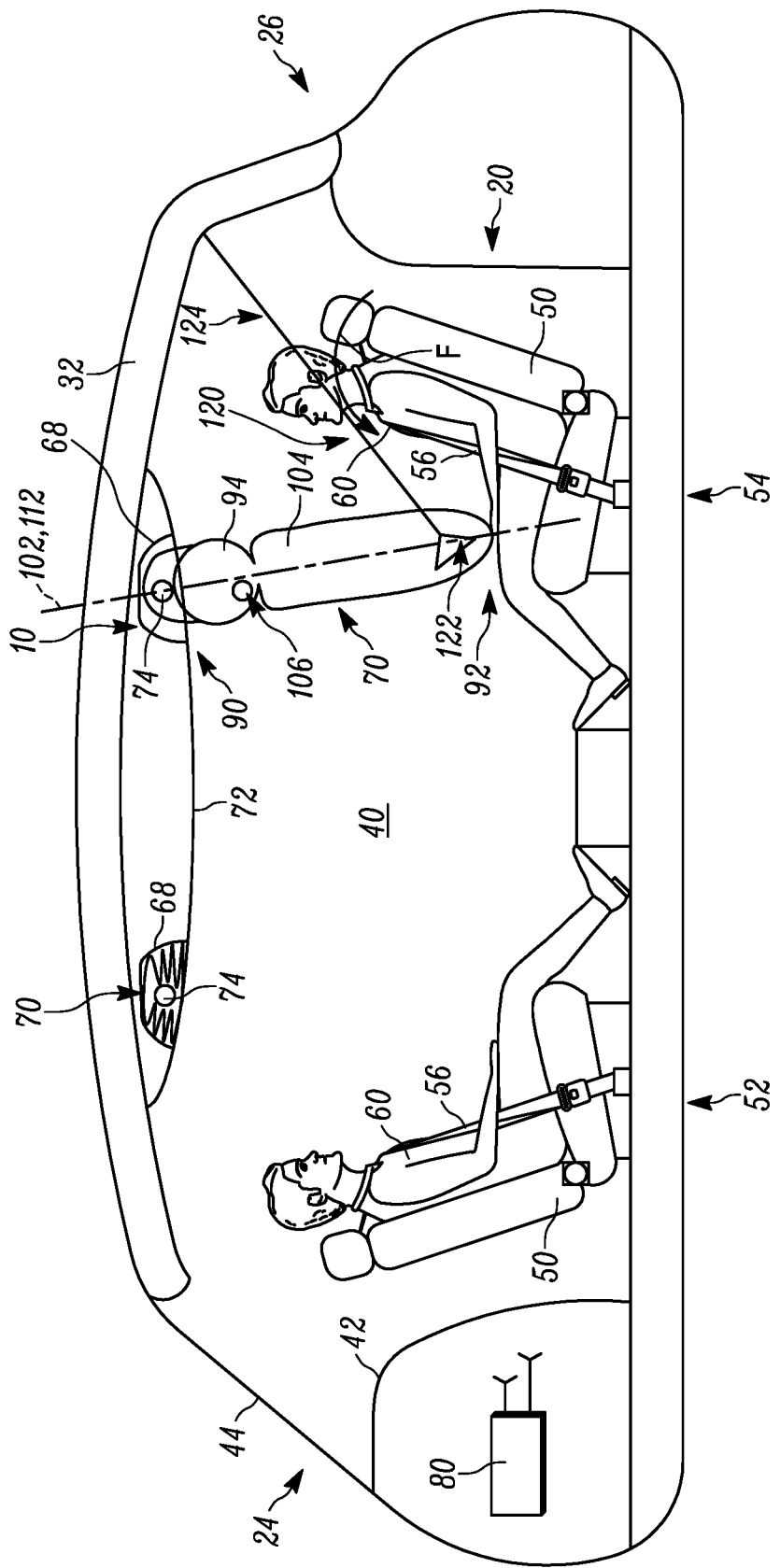
FIG. 3A is a schematic illustration of the cabin of the vehicle with the airbag in a deployed condition.

As shown in FIG. 3A, upon sensing the occurrence of an event for which inflation of the airbag 70 is desired, such as a vehicle collision, the controller 80 provides signals to the inflator 74. Upon receiving the signals from the controller 80, the inflator 74 is actuated and provides inflation fluid to the inflatable volume of the airbag 70 in a known manner. The inflating airbag 70 exerts a force on the roof liner 72, which causes the roof liner to open (e.g., via tear seam or door). This releases the airbag 70 to inflate and deploy from its stored condition behind the roof liner 72 to a deployed condition extending into the cabin 40 forward and aligned with a seat 50 in the rear row 54. The airbag 70, while inflated, helps protect the vehicle occupant 60 in the rear row 54 by absorbing the impact of the occupant.

Figure 3B:
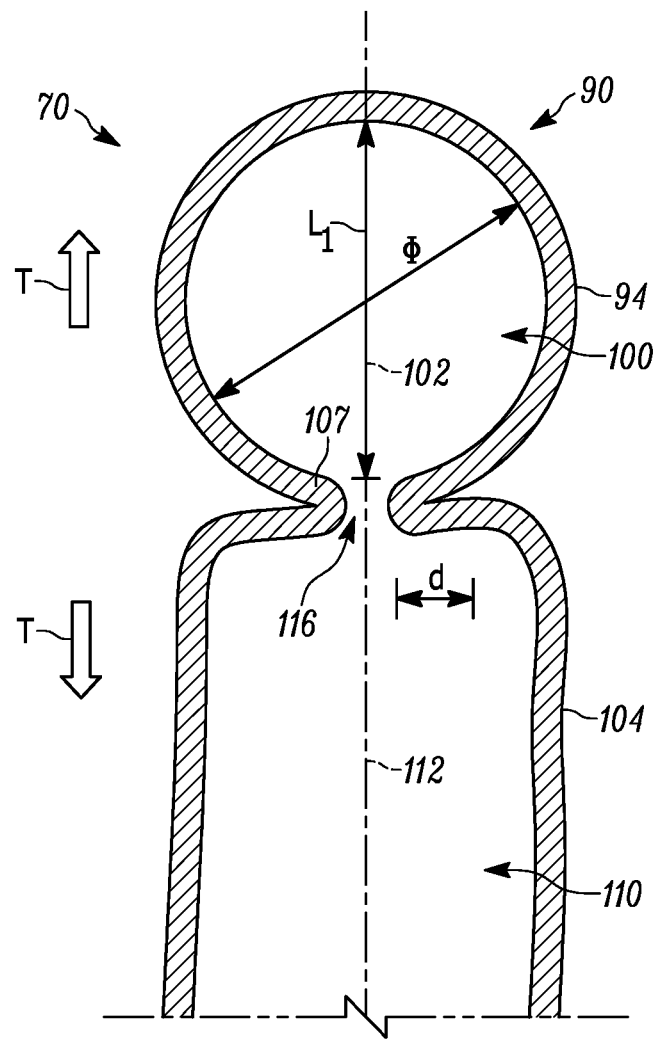
FIG. 3B is an enlarged sectional view of a portion of the airbag of FIG. 3A.

Referring further to FIG. 3B, the inflated airbag 70 extends from an upper end 90 to a lower end 92. The upper end 90 is connected to the vehicle 20 and fluidly connected to the inflator 74. The lower end 92 is positioned adjacent an occupant 60 in the rear row 54. The airbag 70 includes an upper portion 94 extending generally along a centerline 102 and defining an upper inflatable chamber 100. The upper portion 94 includes the upper end 90 and can have a generally round or spherical shape defining an upper chamber 100 with a diameter $\Phi$. In this condition, the length $L_1$ of the upper chamber 100 along the centerline 102 is equal to the diameter $\Phi$. A vent 106 extends through the upper portion 94 and is in fluid communication with the upper chamber 100. The vent 106 can be formed as an unobstructed hole or be an adaptive vent controlled with a release mechanism (not shown).

The airbag 70 also includes a lower portion 104 extending along a centerline 112 and defining a lower inflatable chamber 110. The upper and lower chambers 100, 110 are fluidly connected to one another at a restriction 116. The restriction 116 is a throttled or reduced diameter portion of the airbag 70 that controls the flow of inflation fluid between the chambers 100, 110 and, thus, the restriction can be sized to allow for a prescribed fluid flow between the chambers.

More specifically, the lower chamber 110 fills within inflation fluid first and then inflation fluid from the lower chamber passes through the restriction 116 to fill the upper chamber 100. Consequently, the inflation fluid pressure within the upper chamber 100 can be controlled by sizing the restriction 116 accordingly. To this end, the restriction 116 (FIG. 3B) is defined by a kink or folded portion 107 of the airbag 70 material extending radially inward into the airbag interior a depth d. The folded portion 107 can encircle the centerline 102 or extend partially about the centerline.

As noted, there is no vehicle structure in position to act as a reaction surface to constrain movement of the deployed airbag 70. Consequently, the occupant restraint system 10 can include one or more tethers 120 associated with each airbag 70 and extending from each airbag to locations adjacent to or at the roof 32. Each tether 120 is formed as a single piece of inextensible material and includes a first end 122 connected to the lower portion 104 of the airbag 70. A second end 124 of the tether 120 is connected to the roof 32. The first end 122 can be formed as a stress reducer for spreading the connection between the tether 120 and the airbag 70 over a larger surface area of the airbag fabric so as to prevent tearing.

As shown in FIG. 1, two tethers 120 are connected to the roof 32 on opposite sides of the airbag 70, namely, the inboard and outboard sides of each airbag. The tethers 120 are also connected to the roof 32 at locations that are rearward of the occupant-facing surface of the airbag 70. Because the occupant 60 is belted, a frontal crash resulting in forward occupant movement causes the occupant to bend at the waist and follow an angled or arcuate path toward the airbag 70, as indicated generally by the arrow F in FIG. 3A. Advantageously, as shown in FIG. 3A, the location of the second end 124/roof 32 connections can be selected such that the tethers 120 extend in a direction or along a path that approximates or coincides with (i.e., lies substantially parallel to or coextensive with) the path along which the occupant 60 travels into contact with the airbag 70.

In this manner, the tension the tethers 120 apply to the airbag 70 can be opposite to the impact forces applied to the airbag by the penetrating occupant 60. As a result, the roof 32, through the tethers 120, acts as the reaction surface for the airbag 70. The example configuration of FIG. 3A therefore requires no interaction with forward structure of the vehicle 20, such as an instrument panel, steering wheel, or seat, to provide a reaction surface for the airbag 70.

After the airbag 70 is deployed but prior to occupant penetration (FIG. 3A), the centerlines 102, 112 of the chambers 100, 110 are substantially aligned with one another (i.e., coextensive). The deployed airbag 70 fully tensions the tethers 120, which maintain the lower end 92 of the airbag in the position shown. Since the upper portion 94 is secured to the vehicle 20 both ends 90, 92 of the airbag 70 are held in place.

Figure 4A:
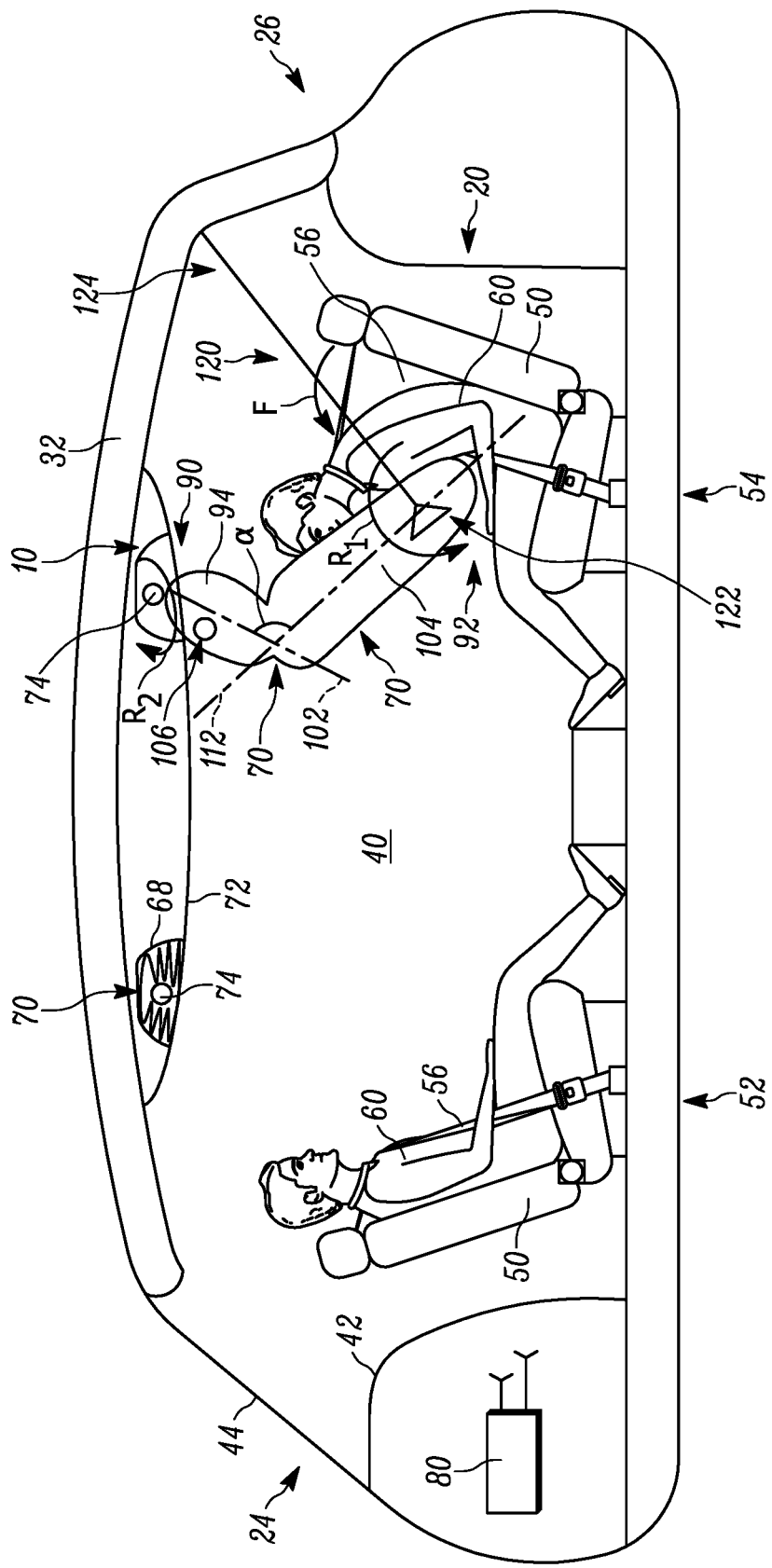
FIG. 4A is a schematic illustration of the cabin of the vehicle following occupant penetration into the deployed airbag.
Figure 4B:
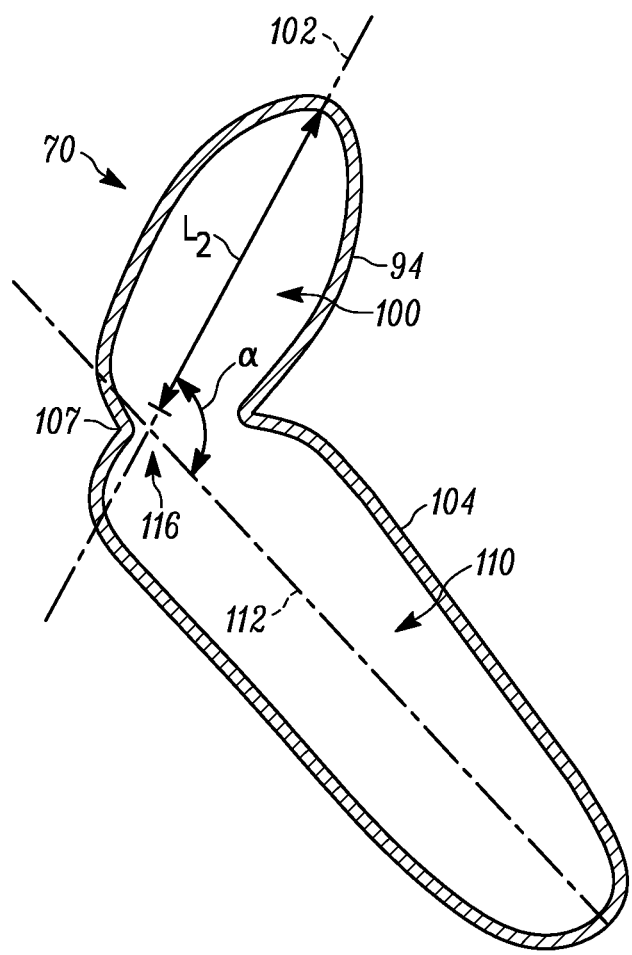
FIG. 4B is an enlarged sectional view of a portion of the airbag of FIG. 4A.

Once the moving occupant 60 engages and penetrates the inflated lower portion 104 (FIG. 4A), the airbag 70 is urged to move in the direction F. Since the tether 120 and vehicle 20 hold the ends 90, 92 of the airbag 70 in place the penetrating occupant 60 causes the airbag to fold or bend away from the occupant 60 at the restriction 116 between the upper and lower portions 94, 104. More specifically, the lower portion 104 pivots about the airbag 70 connection with the first end 122 of the tether 120 in the counterclockwise manner $R_1$ in response to occupant 60 penetration. Since the portions 94, 104 are connected to one another and the upper end 90 connected to the vehicle 20, pivoting the lower portion in the manner $R_1$ urges the upper portion to pivot about the connection with the vehicle 20 in the clockwise manner $R_2$. The airbag 70 therefore folds/bends about the restriction 116 to form an angle $\alpha$ between the centerlines 102, 112 of the upper and lower portions 94, 104. As a result, the airbag 70 provides a ride-down effect on the moving occupant 60 to thereby help reduce loads thereon. The folding airbag 70 accommodates the moving occupant 60 by providing a more gradual reaction force in response to occupant penetration.

Several factors contribute to allowing/facilitating the airbag 70 folding in this manner. First, unlike the upper portion 94, the lower portion 104 does not include a vent and, thus, the lower chamber 110 has higher fluid pressure when inflated than the upper chamber 100. The lower portion 104 is therefore stiffer and has an increased resistance to deformation compared to the upper portion 94.

Furthermore, the vent 106 in the upper portion 94 ensures that the upper portion maintains a lower fluid pressure than the lower portion 104 and that inflation fluid can escape the upper chamber 100. The size of the vent 106 can therefore be chosen to provide a desired inflation fluid pressure in the upper chamber 100. When the penetrating occupant 60 urges the lower portion 104 to pivot in the manner $R_1$, the vent 106 not only releases inflation fluid from the upper chamber 100 but also increases the flexibility of the upper portion 94 to allow the upper portion to pivot in the manner $R_2$. As a result, although both ends 90, 92 of the airbag 70 are fixed in place by the vehicle 20 and tether 120, respectively, the airbag is capable of folding at the restriction 116.

It will be appreciated that although the lower end 92 of the airbag 70 is shown being held in place by tethers 120 the airbag could alternatively deploy into engagement with the occupant's 60 lap or lower torso, in which case the tethers would be omitted (not shown). In other words, the airbag 70 could be sized to deploy downwards into engagement with the occupant 60 such that the occupant—not the tethers 120—fixes the lower end 92 of the airbag 70 in place to enable the airbag to fold at the restriction 116 in response to occupant penetration into the lower portion 104.

In any case, when the upper portion 94 begins to pivot in the manner $R_2$, the airbag 70 material in the upper portion is tensioned due its fixed connections with the vehicle 20 and the lower portion 104. The spherical shape of the upper portion 94 prior to occupant 60 engagement with the lower portion 104 begins to elongate along the centerline 102 into an elliptical shape because the vent 106 releases inflation fluid.

When this occurs, the folded portion 107 becomes tensioned and allowed to unfurl, thereby furthering lengthening the upper portion 94 along the centerline 102. Lengthening of the upper portion 94 allows the upper portion to move further in the manner $R_2$ to accommodate the penetrating occupant 60. The degree to which the folded portion 107 unfurls can be dictated by the size of the occupant 60 penetrating the lower portion 104—the larger the occupant the more force on the lower portion and therefore the greater extent the folded portion 107 unfurls, which allows the upper portion 94 to elongate and move further in the manner $R_1$. In each case, the upper portion 94 absorbs the impact energy of the penetrating occupant 60 by elongating and discharging inflation fluid (i.e., deflating), thereby helping ensure the airbag 70 remains sufficiently rigid but also allowing the airbag to fold away from and accommodate the penetrating occupant in a prescribed manner.

That said, elongating the upper portion 94 increases the length of the upper chamber 100 to a length $L_2$ greater than the length $L_1$. In other words, the upper portion 94 is flattened in response to the forward-moving occupant 60 penetrating the lower portion 104, which allows the upper portion to elongate and move in the manner $R_2$. The amount of pivotal movement M by the upper portion 94 in the manner $R_2$ is dictated by the following equation:

$$M = \frac{3.14D}{2} - D;$$

where D is the diameter $\Phi$ of the upper chamber 100. Consequently, the diameter $\Phi$ of the upper chamber 100 can be chosen to provide a desired degree of movement in the upper portion when the occupant 60 penetrates the lower portion 104. Along the same lines, it will be appreciated that the depth d of the folded portion 107 can be selected to provide a desired degree of pivotal movement by the upper portion 94 in the manner $R_1$. In other words, increasing the depth d of the folded portion 107 increases the degree to which the airbag 70 is capable of folding in response to occupant 60 penetration.

The occupant restraint system described herein is advantageous because the airbag adapts to the penetrating occupant by folding and elongating in order to provide the ride-down effect on the penetrating occupant. The degree to which the airbag folds can be readily tailored by adjusting the size of the vent, the size of the restriction, the length of the folded portion and/or the diameter of the upper chamber.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A restraint system for helping to protect an occupant of a vehicle having a roof and a cabin including a seat for the occupant, comprising:
   an airbag having a stored condition within the roof and being inflatable to a deployed condition extending into the cabin and aligned with the seat, the airbag including a first portion defining a first chamber and a second portion defining a second chamber, the first portion being connected to the vehicle and including a vent; and
   wherein the first portion, in response to occupant penetration with the second portion, vents inflation fluid from the vent and elongates to enable folding of the airbag away from the occupant.

2. The restraint system recited in claim 1, wherein the first chamber has a first inflation fluid pressure and the second chamber has a second inflation fluid pressure greater than the first inflation fluid pressure.

3. The restraint system recited in claim 1, wherein the first chamber has a first length prior to occupant penetration into the second portion and a second length greater than the first length in response to occupant penetration into the second portion.

4. The restraint system recited in claim 1, wherein the first portion extends along a first centerline and the second portion extends along a second centerline, the first and second centerlines being substantially coextensive when the airbag is deployed and prior to occupant penetration into the second portion and being angled relative to one another in response to occupant penetration into the second portion.

5. The restraint system recited in claim 1 further comprising at least one tether having a first end connected to the second portion and a second end connected to the vehicle for limiting movement of the deployed airbag.

6. The restraint system recited in claim 5, wherein the second end of each tether is connected to the roof.

7. The restraint system recited in claim 6, wherein the second portion pivots about the first end of the tether and the first portion pivots about the vehicle in response to occupant penetration into the second portion.

8. The restraint system recited in claim 7, wherein the first and second portions pivot in opposite directions from one another.

9. The restraint system recited in claim 1, wherein the first portion is spherical prior to occupant penetration into the second portion and elliptical in response to occupant penetration into the second portion.

10. The restraint system recited in claim 1, wherein the airbag further includes a folded portion extending into an interior of the airbag between the first and second chambers prior to occupant penetration into the airbag and unfurling in response to occupant penetration into the airbag to elongate the first portion.

11. A restraint system for helping to protect an occupant of a vehicle having a roof and a cabin including a seat for the occupant, comprising:

an airbag having a stored condition within the roof and being inflatable to a deployed condition extending into the cabin and aligned with the seat, the airbag including a first portion defining a first chamber and a second portion defining a second chamber, the first portion being connected to the vehicle and including a vent, a folded portion extending into an interior of the airbag between the first and second chambers prior to occupant penetration into the airbag; and a pair of tethers each having a first end connected to the second portion and a second end connected to the roof for limiting movement of the deployed airbag, the second portion pivoting about the first end of the tether and the first portion pivoting about the vehicle in response to occupant penetration into the second portion such that inflation fluid exits the vent to allow the airbag to fold away from the penetrating occupant.

12. The restraint system recited in claim 11, wherein the first chamber has a first inflation fluid pressure and the second chamber has a second inflation fluid pressure greater than the first inflation fluid pressure.

13. The restraint system recited in claim 11, wherein the first chamber has a first length prior to occupant penetration into the second portion and a second length greater than the first length in response to occupant penetration into the second portion.

14. The restraint system recited in claim 11, wherein the first portion extends along a first centerline and the second portion extends along a second centerline, the first and second centerlines being substantially coextensive when the airbag is deployed and prior to occupant penetration into the second portion and being angled relative to one another in response to occupant penetration into the second portion.

15. The restraint system recited in claim 11, wherein the first and second portions pivot in opposite directions from one another.

16. The restraint system recited in claim 11, wherein the first portion is spherical prior to occupant penetration into the second portion and elliptical in response to occupant penetration into the second portion.

* * * * *